United States Patent
Moore et al.

(10) Patent No.: US 11,598,464 B2
(45) Date of Patent: Mar. 7, 2023

(54) DELIVERY ASSEMBLY FOR CROP INPUT DELIVERY SYSTEM

(71) Applicant: 360 Yield Center, LLC, Morton, IL (US)

(72) Inventors: Nowell Moore, Tremont, IL (US); Justin Koch, Tremont, IL (US); Jesse Kaiser, Tremont, IL (US); Nathan Bidner, Tremont, IL (US)

(73) Assignee: 360 Yield Center, LLC, Morton, IL (US)

( * ) Notice: Subject to any disclaimer, the term of this patent is extended or adjusted under 35 U.S.C. 154(b) by 431 days.

(21) Appl. No.: 16/741,727

(22) Filed: Jan. 13, 2020

(65) Prior Publication Data
US 2020/0224808 A1    Jul. 16, 2020

Related U.S. Application Data (60) Provisional application No. 62/791,667, filed on Jan. 11, 2019.

(51) Int. Cl.
*F16L 37/127*    (2006.01)
*B65G 67/04*    (2006.01)
(Continued)

(52) U.S. Cl.
CPC ............ *F16L 37/127* (2013.01); *B65G 67/04* (2013.01); *F16L 25/009* (2013.01); *F16L 25/06* (2013.01);
(Continued)

(58) Field of Classification Search
CPC ............... B65G 67/04; B65G 2201/04; B65G 2814/0301; A01C 15/006; F16L 37/127; F16L 25/009; F16L 25/06; F16L 45/00
See application file for complete search history.

(56) References Cited

U.S. PATENT DOCUMENTS

| 3,620,268 A | 11/1971 | Paddington |
| 4,007,765 A | 2/1977 | Bellows |

(Continued)

FOREIGN PATENT DOCUMENTS

WO    2018/237401    12/2018

OTHER PUBLICATIONS

International Search Report, Application No. PCT/US2018/039372, dated Sep. 2,4, 2018, 2 pages.
(Continued)

*Primary Examiner* — Gregory W Adams
(74) *Attorney, Agent, or Firm* — Larkin Hoffman Daly & Lindgren, Ltd.; Thomas J. Oppold (57) ABSTRACT

A delivery assembly for a crop input delivery system. The delivery system includes a boom adapted to be supported at a proximal end from a mobile vehicle, the mobile vehicle holding a supply of the crop input, the boom supporting a conduit having a proximal end in fluid communication with the supply of crop input. The delivery system further includes a first coupler and a second coupler. The first coupler is supported on a distal end of the boom and is coupled to the conduit. The second coupler is in fluid communication with a storage tank disposed on the implement, the second coupler configured to fluidly couple with the first coupler. A clamping assembly releasably couples the first and second couplers in fluid engagement.

9 Claims, 8 Drawing Sheets

(51) Int. Cl.
  *F16L 25/06* (2006.01)
  *F16L 45/00* (2006.01)
  *F16L 25/00* (2006.01)
(52) U.S. Cl.
  CPC ...... *F16L 45/00* (2013.01); *B65G 2814/0301* (2013.01)

(56) References Cited

U.S. PATENT DOCUMENTS

| | | | |
|---|---|---|---|
| 4,023,518 A * | 5/1977 | Fahrner | E02F 7/04 |
| | | | 285/97 |
| 4,408,943 A * | 10/1983 | McTamaney | F16L 27/0861 |
| | | | 137/554 |
| 4,483,376 A * | 11/1984 | Bresie | F17C 5/007 |
| | | | 141/196 |
| 4,998,560 A | 3/1991 | Le Devehat | |
| 5,291,922 A * | 3/1994 | Martin | B67D 7/048 |
| | | | 96/174 |
| 5,368,232 A | 11/1994 | Schroeder | |
| 6,000,428 A * | 12/1999 | Berberat | B67D 7/78 |
| | | | 137/234.6 |
| 6,375,123 B1 * | 4/2002 | Greenhalgh | B64D 39/04 |
| | | | 244/135 A |
| 7,300,004 B2 | 11/2007 | Sinden | |
| 8,402,746 B2 | 3/2013 | Powell | |
| 9,265,187 B2 | 2/2016 | Cavender-Bares | |
| 9,296,604 B2 | 3/2016 | Ballu | |
| 9,708,040 B2 | 7/2017 | Le Devehat | |
| 2004/0084551 A1 | 5/2004 | Vickers | |
| 2010/0018608 A1 * | 1/2010 | Huegerich | A01M 7/0082 |
| | | | 137/579 |
| 2012/0181465 A1 * | 7/2012 | Rusconi | F16L 37/36 |
| | | | 137/614.04 |
| 2013/0206278 A1 | 8/2013 | Ballu | |
| 2015/0142250 A1 | 5/2015 | Cavender-Bares et al. | |
| 2017/0367261 A1 | 12/2017 | Matousek | |
| 2019/0152714 A1 | 5/2019 | Brechon | |
| 2019/0302783 A1 | 10/2019 | Morwood | |
| 2019/0337725 A1 | 11/2019 | Gerdeman | |
| 2020/0224808 A1 | 7/2020 | Moore | |

OTHER PUBLICATIONS

International Preliminary Report on Patentability, Application No. PCT/US2018/039372 dated Dec. 24, 2019, 7 pages.
Written Opinion, Application No. PCT/US2018/039372, dated Sep. 24, 2018, 6 pages.

* cited by examiner

DELIVERY ASSEMBLY FOR CROP INPUT DELIVERY SYSTEM

CROSS-REFERENCE TO RELATED APPLICATIONS

This application claims the benefit of U.S. Provisional Application No. 62/791,667 filed Jan. 11, 2019 which is incorporated herein in its entirety by reference.

BACKGROUND

Various implements are used in agriculture to apply various crop inputs to fields, such as seed, liquid and granular fertilizers, pesticides, etc. Such implements generally have one or more hoppers or tanks on-board the implement which hold the crop inputs and from which the crop inputs are dispensed as the implement traverses the field. The tanks or hoppers (collectively hereinafter "tanks") have limited capacity and therefore require frequent refilling depending on the volume of the tanks, the rate the crop inputs are applied, and various other factors. When the tanks require refilling, the operator must stop field operations to refill the tanks from an available supply source. The available supply source may be a bin or holding tank at a remote location to where the implement must be driven for refilling, or the available supply source may be another vehicle (e.g., as a pickup truck carrying the crop input in sacks, or a wagon, grain cart or a holding tank) parked at one end of a field or along a road near the field. Alternatively, the operator may need to wait at one end of the field or in the middle of a field or other location until the operator is met by the supply vehicle. Regardless of which of the above described methods the grower uses for resupplying the implement with crop inputs, the cumulative effect of the frequent stops results in extended downtime in field operations during a planting season or other crop input application period, which most growers can ill-afford.

Accordingly, there is a need for a crop input supply system that minimizes or eliminates downtime of field operations of the agricultural implement.

DESCRIPTION

Figure 1:
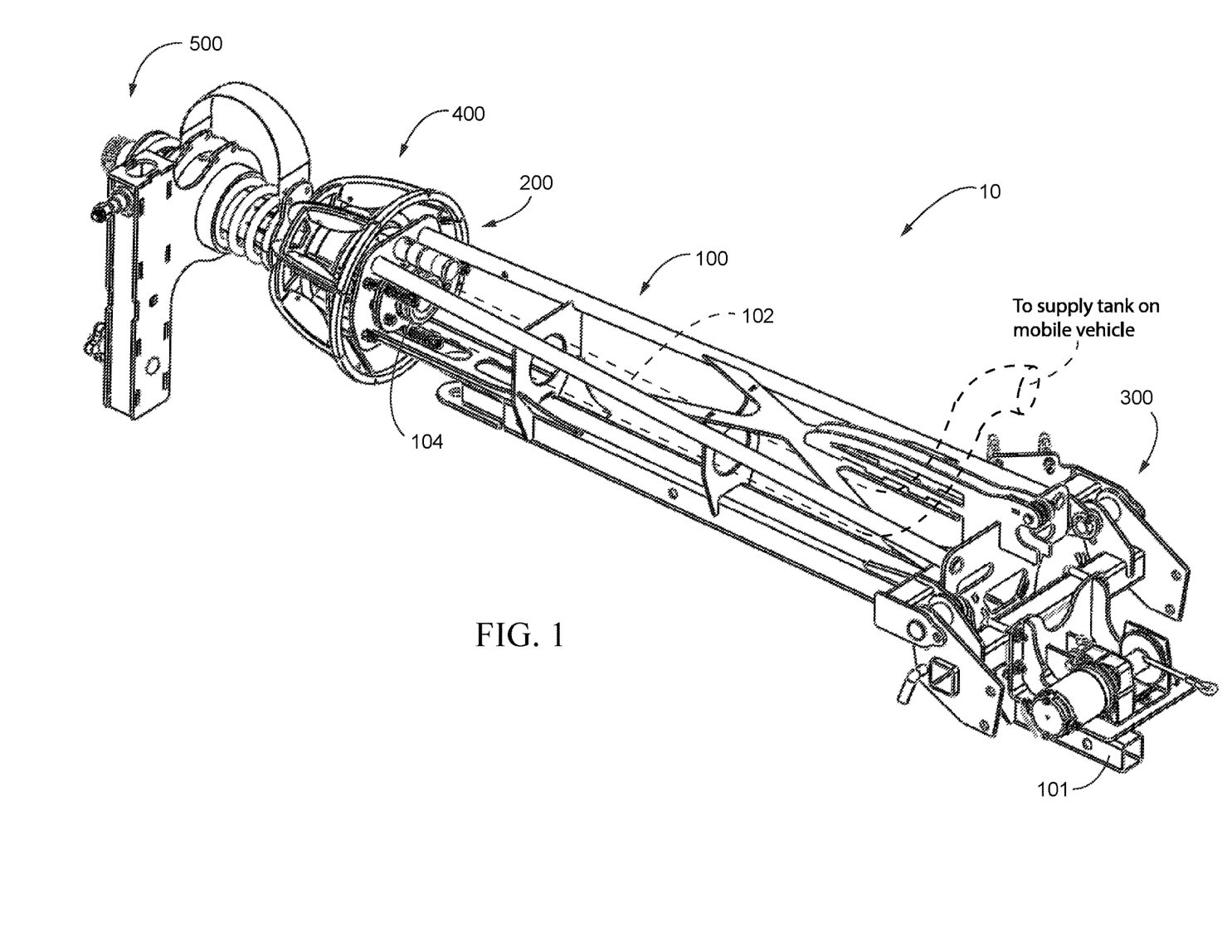
FIG. 1 is a perspective view of an embodiment of a delivery assembly showing a male coupler and a female coupler in a coupled configuration.

Referring now to the drawings wherein like reference numerals designate the same or corresponding parts throughout the several views, FIG. 1 illustrates a delivery assembly 10 which may be used in a delivery system for delivering crop input (e.g., fluid crop input such as fertilizer) from a mobile vehicle, such as a utility vehicle (not shown), to an implement such as a planter, sprayer, etc. (not shown), such as disclosed in International Patent Publication No. WO2018/237401 (Application No. PCT/US2018/039372), incorporated herein by reference in its entirety.

The delivery assembly 10 includes a boom 100 which may be adjusted in position (e.g., raised, lowered, pivoted, etc.) by a boom adjustment assembly 300. The boom 100 is supported from by the mobile vehicle such as a utility vehicle. For example, the rearward end of the boom 100 may include a hitch 101 configured to be received by a hitch receiver (not shown) mounted to the mobile vehicle such that a distal end of the boom 100 extends forwardly of the mobile vehicle.

The delivery assembly 10 includes a male coupler 200 supported on a forward end of the boom 100. The male coupler 200 is configured to couple with a female coupler 400 supported on the implement (e.g., to a row unit of a planter) by a mounting assembly 500. Alternatively, the male coupler 200 may be supported on the implement and the female coupler may be supported on the forward end of the boom 100. A hose, pipe or conduit 102 extends through the boom 100. One end of the conduit 102 is coupled to a fitting 104 on the rearward side of the male coupler 200 (or to the female coupler 200, if the female coupler is supported by the boom 100). The other end of the conduit 102 is in fluid communication with a supply tank (not shown) which holds the supply of crop input to be transferred to the implement when the male and female couplers 200, 400 are coupled and as described in more detail in International Patent Publication No. WO2018/237401 previously incorporated herein by reference.

Figure 2:
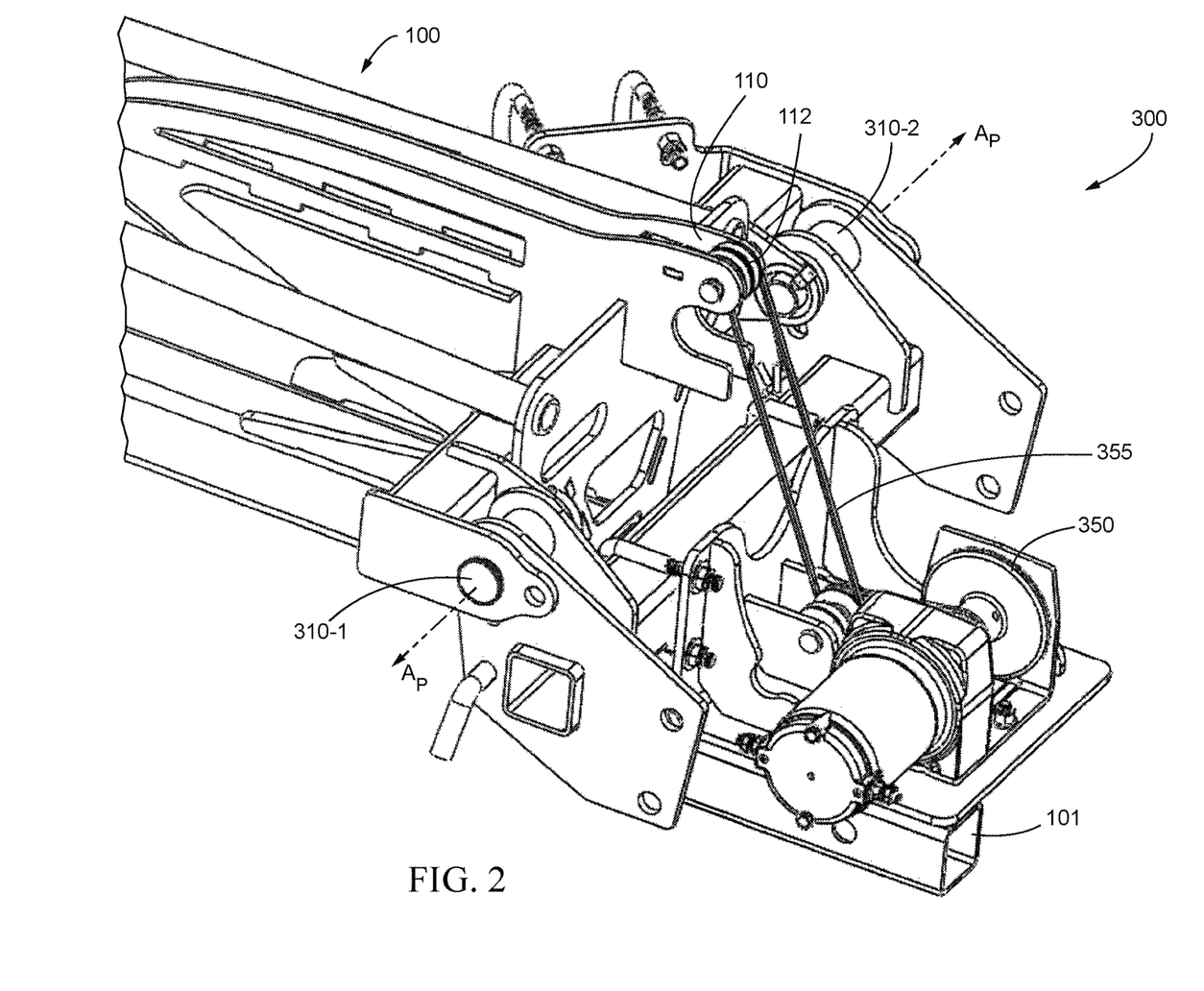
FIG. 2 is an enlarged perspective view of an embodiment of a boom adjustment assembly.

Referring to FIG. 2, the delivery assembly 10 includes a boom adjustment assembly 300 to permit vertical height adjustment of the distal end of the boom 100. In one embodiment, the boom adjustment assembly 300 permits the boom 100 to pivot about an axis Ap (e.g., generally horizontal axis) which may be defined by one or more pivots 310 (e.g., pins, etc.) The boom adjustment assembly 300 may include a winch 350 which operably extends and retracts a cable 355 connected at one end to a plate 110 or other suitable structure on the boom 100 and with the other end of the cable 355 secured to the winch 350 such that extension and retraction of cable 355 by the winch 350 causes vertical positional adjustment of the distal end of the boom 100 for alignment and coupling of the male coupler 200 with the female coupler 400. The winch 350 may include a reversible electric winch motor 352 operable by the operator of the mobile vehicle. For example, by actuating the winch motor 352 in one direction, the cable 355 is retracted (e.g., by winding around a spool) which will cause the distal end of the boom 100 to raise by pivoting upwardly about axis Ap. If the winch motor 352 is rotated in the opposite direction, the cable 355 is extended (e.g., by unwinding from a spool) which will cause the distal end of the boom 100 to lower by pivoting downwardly about axis Ap.

Figure 3:
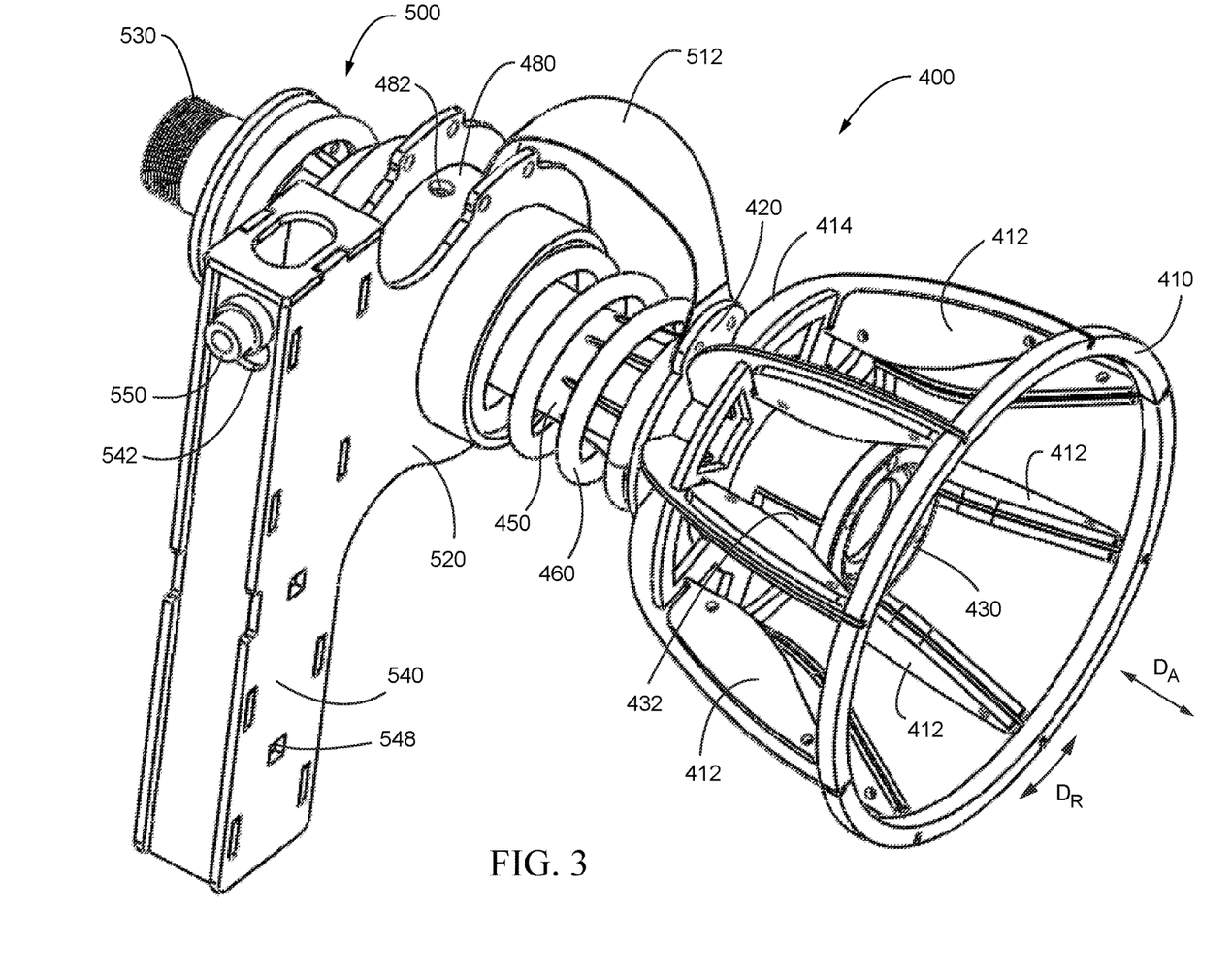
FIG. 3 is a perspective view of an embodiment of the female coupler and a mounting assembly.

Referring to FIG. 3, the female coupler 400 is illustrated in more detail. In some embodiments, a plurality of radially arranged fins 412 are supported on rings 410, 414. The fins 412 guide the male coupler 200 into engagement with a mating seal 430, placing the male coupler 200 in fluid communication with a conduit 450. The conduit 450 is in fluid communication with a fitting 530 which is in fluid communication with a tank (not shown) on the implement (not shown).

Continuing to refer to FIG. 3, in some embodiments the female coupler 400 is supported on a mounting assembly 500. In the illustrated embodiment, the female coupler 400 is resiliently supported on mounting assembly 500 via a spring 460 which resiliently permits movement of the female coupler 400 in a rotational direction Dr and/or in an axial direction Da relative to the mounting assembly. The spring 460 may be received in a collar 480 and may be further held in place by a fastener (not shown) such as a U-bolt which may extend through one or more openings 482 in the collar 480. Clocking structure 512 (e.g., a resilient strap or other structure) may connect a flange 520 of the mounting assembly 500 to a flange 420 of the female coupler 400. The clocking structure 512 may resiliently permit rotation of the female coupler 400.

Figure 4:
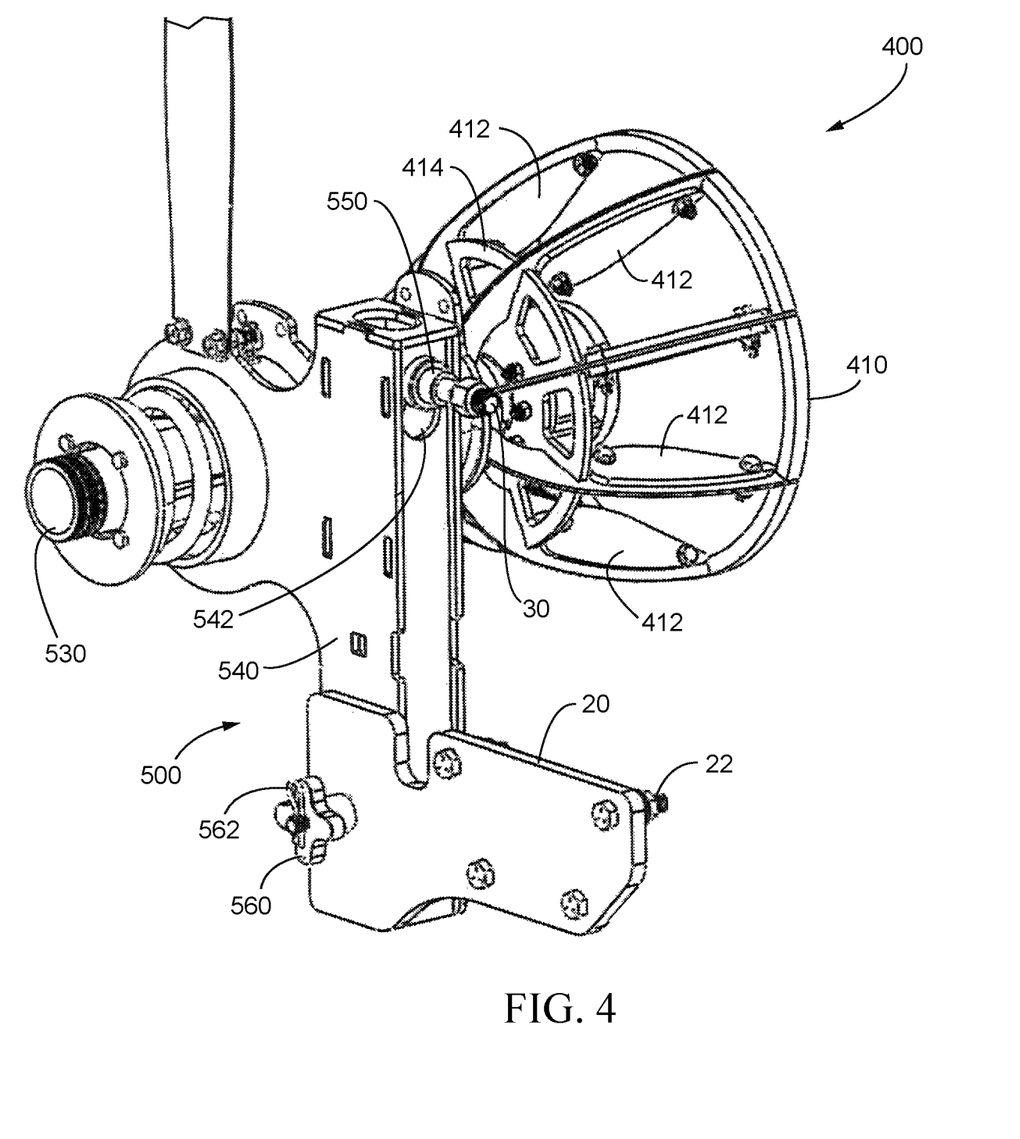
FIG. 4 is another perspective view of the female coupler and mounting assembly of FIG. 3.

Referring to FIGS. 3 and 4, in some embodiments the mounting assembly 500 is supported by a plate 20 which may be supported on the implement (e.g., the row unit of a planter) by one or more bolts 22. The mounting assembly 500 may include a body portion 540 which may have one or more openings 548 for mounting the plate 20 to the body portion 540, e.g., using a carriage bolt or other fastener (not shown). In some embodiments the body portion 540 may be released from the plate 20 without the use of tools by loosening the fastener, e.g., by removing a pin 562 and/or manipulating a handle 560 connected to the fastener. In some embodiments, the mounting assembly 500 includes a bushing 550 which may be mounted to a bolt 30 (e.g., lengthened bolt) of a row unit parallel arm of the implement. In some embodiments, moving the body portion upward (e.g., after disconnecting the body portion 540 from plate 20) allows the bushing 550 to be removed via an opening 542 in the body portion 540.

Figure 6:
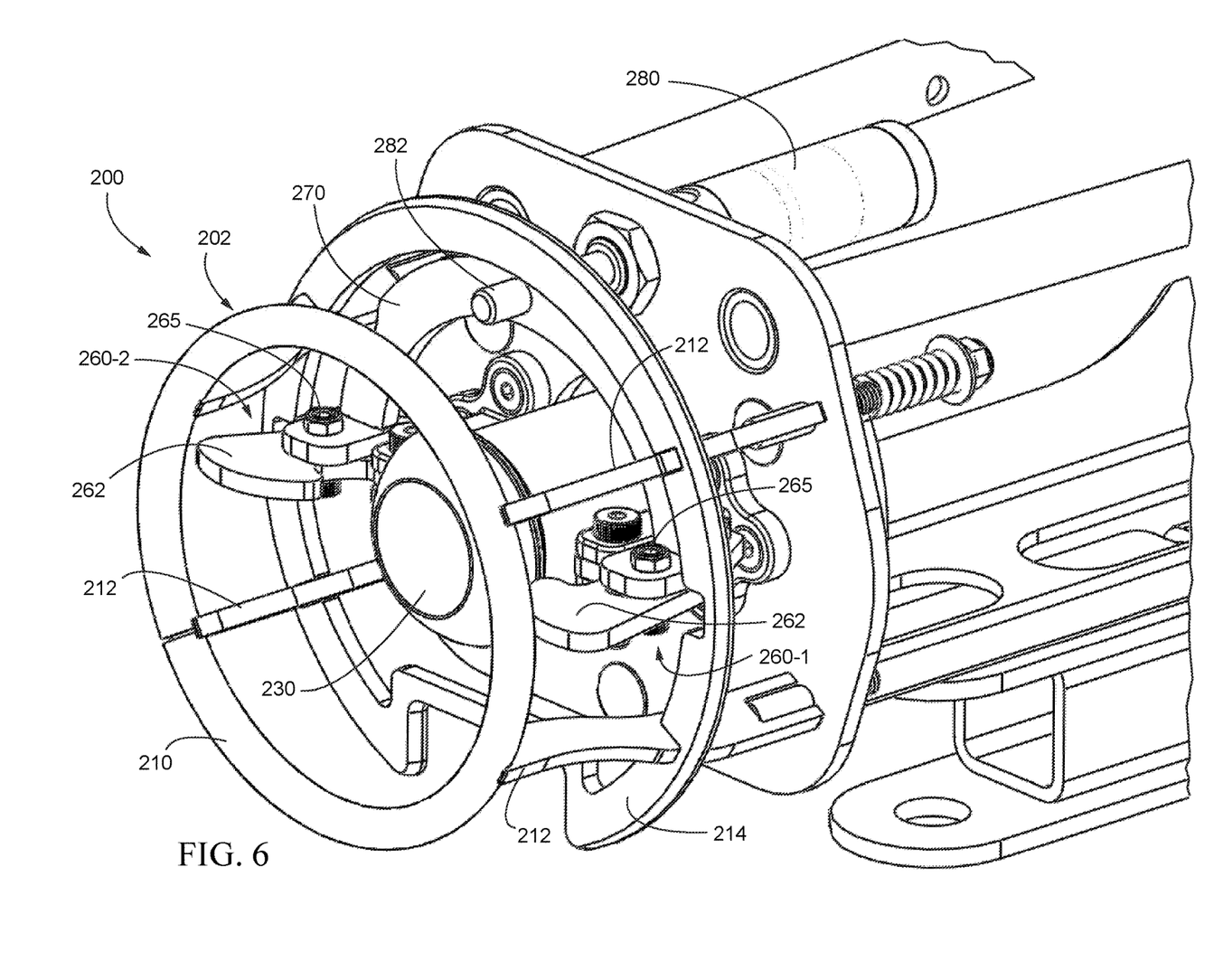
FIG. 6 is perspective view of an embodiment of the male coupler.
Figure 7:
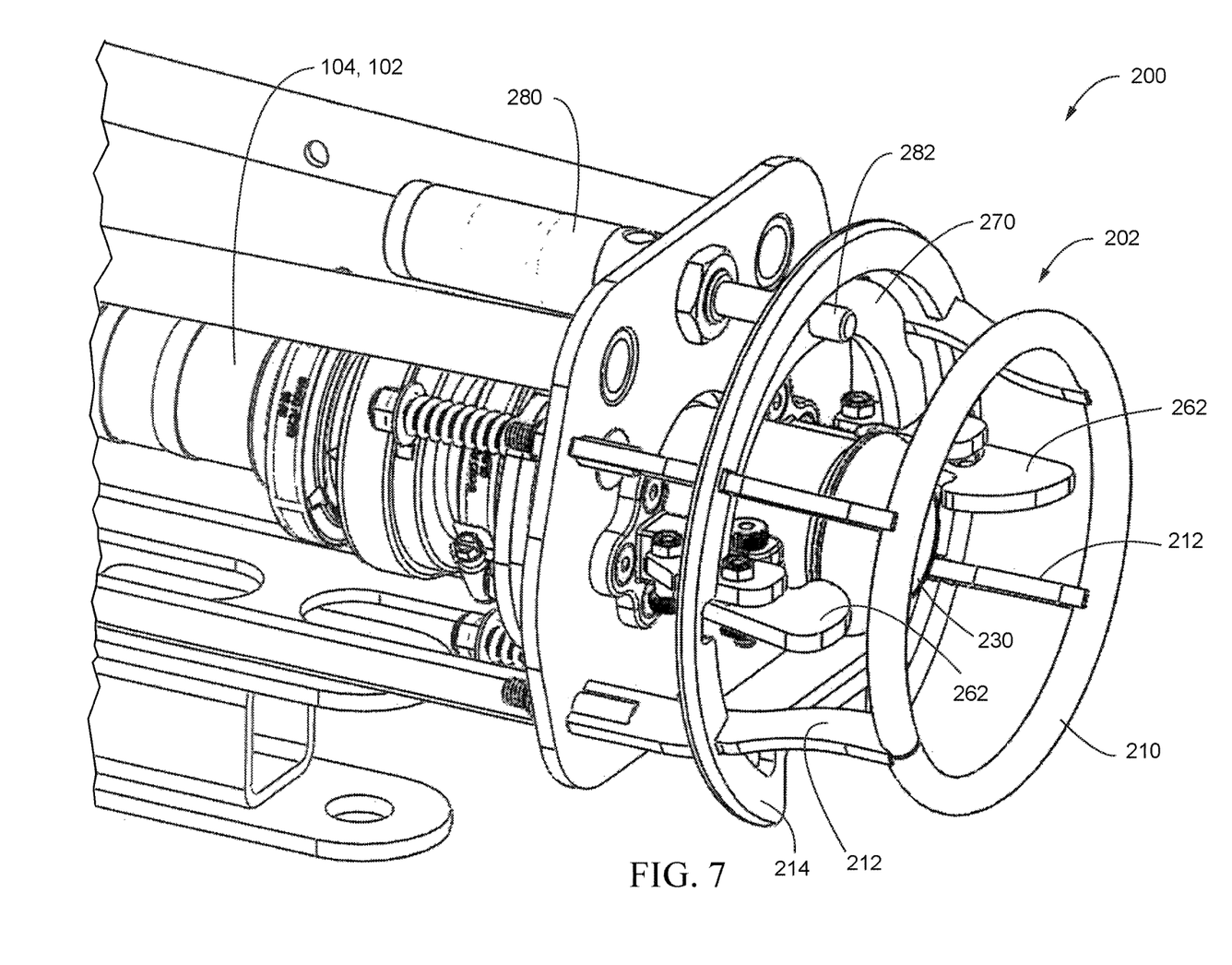
FIG. 7 is another perspective view of the male coupler of FIG. 6.
Figure 8:
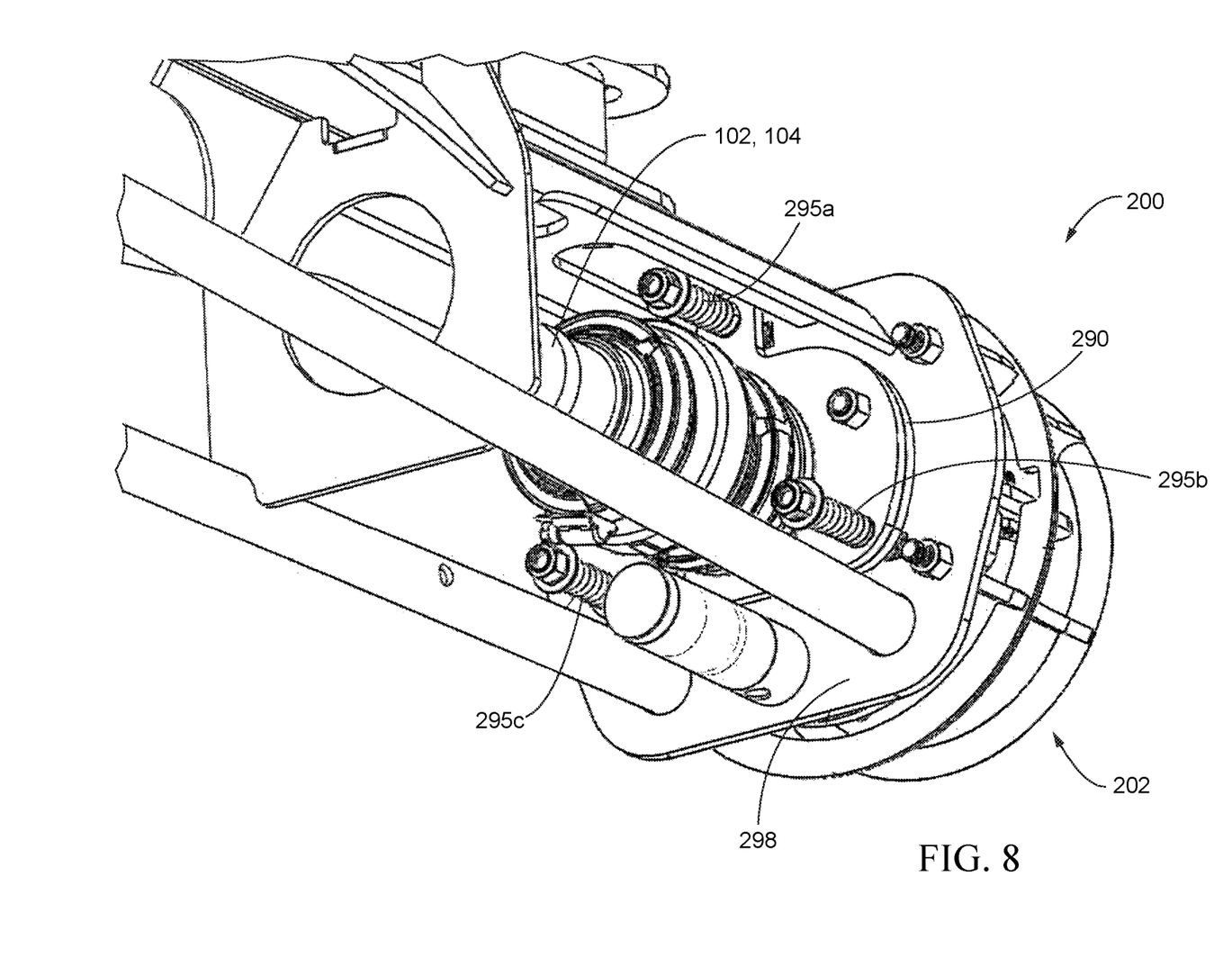
FIG. 8 is another perspective view of the male coupler of FIG. 6.

Referring to FIG. 6-8, the male coupler 200 is illustrated in more detail. The male coupler 200 may include a connection point 230 (e.g., nozzle) configured to mate with the mating seal 430 of the female coupler 400. The connection point 230 may be at least partially surrounded by a structure 202 which may comprise one or more fins 212 supported on rings 210, 214. The structure 202 is configured to guide the connection point 230 into engagement with the mating seal 430, e.g., by being guided by fins 412 of the female coupler 400. Once the connection point 230 and mating seal 430 are engaged, one or more clamping assemblies 260 may releasably secure the male coupler 200 to the female coupler 400. In some embodiments, each clamping assembly 260 includes a clamp plate 262 pivotally mounted on a pivot 265. The clamp plate 262 is pivotable between a clamping position and a release position, whereby in the clamping position the clamp plate 262 is received in a recess 432 (see FIG. 3) of the female coupler 400 and in the release position, the clamp plate 262 is disengaged from the recess 432. In order to pivot the clamp plates 262, an actuator 280 may selectively extend a rod 282 which is operably coupled to the clamp plates 262. For example, the rod 282 may be coupled to a plate 270 (e.g., semi-annular plate) which is in turn coupled to each of the clamping assemblies 260 such that advancing the plate 260 causes the clamp plates 262 to close into the clamping position and open into the release position.

Referring to FIG. 8, the structure 202 is optionally supported on a plate 298. The connection point 230 is optionally supported on a plate 290 which is optionally resiliently biased against plate 298. In some embodiments, the plate 290 is resiliently biased against plate 298 by a plurality of springs 295, e.g., three springs 295a, 295b, 295c which are optionally radially arranged (e.g., at intervals of 120 degrees or approximately 120 degrees) about the connection point 230.

In operation, the mobile vehicle on which the boom 100 is mounted and from which the boom extends forwardly, drives up to the implement to which the crop input is to be transferred. The operator of the mobile vehicle operates the boom adjustment assembly 300 to align the male and female couplers 200, 400. Once the male and female couplers 200, 400 are aligned and clamped together by actuating the actuator 280, the pump on the mobile vehicle is activated to begin transferring the crop input from the supply tank on the mobile vehicle to the storage tanks on the implement. When the storage tanks on the implement are filled, the pump is turned off and the actuator 280 is actuated to unclamp and decouple the male and female couplers 200, 400.

Figure 5:
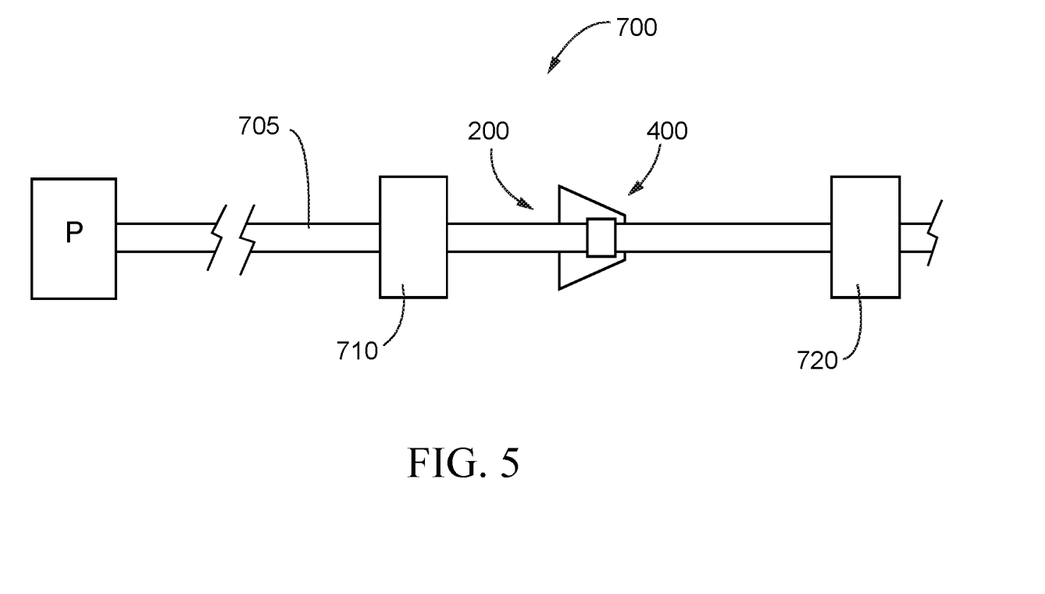
FIG. 5 is a schematic illustration of an embodiment of a delivery system.

In order to avoid dripping of the crop input when the male and female couplers 200, 400 are decoupled, a delivery system 700 schematically represented in FIG. 5 may be employed. In this embodiment 700, the crop input (e.g., liquid) may include a first check valve 710 before or upstream of the male and female couplers 200, 400 and may optionally include a second check valve 720 after or downstream of the male and female couplers 200, 400. In operation, the second check valve 720 holds back the liquid and keeps it on the implement by preventing the liquid from returning toward the female coupler 400 and the first check valve 710 acts as a dribble valve to prevent any remaining liquid in the conduit or hose 102/705 from exiting the male coupler 200. In some implementations, a pump (P) such as a compressed air pump is used to push liquid out of a hose 705 before decoupling the male and female couplers 200, 400 to prevent any leftover liquid in the hose (if any) from dribbling out of the hose end when disconnected.

Various modifications to the embodiments and the general principles and features of the apparatus, systems and methods described herein will be readily apparent to those of skill in the art. Thus, the foregoing disclosure is not to be limited to the embodiments of the apparatus, systems and methods described herein and illustrated in the drawing figures, and should be interpreted broadly to include all variations and modifications coming within the scope of the appended claims and their legal equivalents.

The invention claimed is:

1. A delivery assembly for delivering a crop input to an agricultural implement while the agricultural implement is traveling in a forward direction of travel during field operations so as to minimize downtime of the agricultural implement, the delivery system comprising:
   a mobile vehicle holding a supply of the crop input;
   a boom having a proximal end and a distal end, the proximal end of the boom supported from the mobile vehicle, the distal end of the boom adapted to extend relative to the mobile vehicle;
   a conduit having a proximal end and a distal end, the proximal end of the conduit in fluid communication with the supply of crop input, the distal end of the conduit supported by the distal end of the boom;
   a first coupler supported from the distal end of the boom, the first coupler coupled to the distal end of the conduit;
   a second coupler in fluid communication with a storage tank disposed on the agricultural implement, the second coupler configured to fluidly couple with the first coupler;
   a clamp assembly movable between a clamping position and a release position, wherein, in the clamping position, the first and second couplers are held in fluid engagement with one another, and wherein, in the release position, the first and second couplers are fluidly disengaged from one another;

a mounting assembly operably supporting the second coupler on the agricultural implement, the mounting assembly including a spring which enables resilient movement of the second coupler in an axial direction with respect to the mounting assembly;

a clocking structure including a strap resiliently connecting the second coupler with the mounting assembly, the clocking structure enabling resilient rotational movement of the second coupler with respect to the mounting assembly;

whereby, the mobile vehicle is adapted to be driven into a position relative to the agricultural implement while the agricultural implement continues traveling in the forward direction of travel during field operations, and whereby the boom is adapted to extend relative to the mobile vehicle to position the first and second couplers into fluid engagement with one another so as to transfer the crop input from the supply of crop input on the mobile vehicle to the storage tank on the agricultural implement when the clamp assembly is in the clamping position, all while the agricultural implement continues traveling in the forward direction of travel during field operations.

2. The delivery assembly of claim 1, wherein one of the first and second couplers is a female coupler and wherein another one of the first and second couplers is a male coupler, and wherein the female coupler includes guide structure configured to guide the male coupler into said female coupler.

3. The delivery assembly of claim 1, further comprising a boom adjustment assembly configured to vertically adjust a positional height of the distal end of the boom so as to enable vertical alignment of the first coupler with the second coupler.

4. The delivery assembly of claim 3, wherein the boom adjustment assembly includes a pivot axis, a cable connected at one end to the boom and a winch operable to retract and extend the cable to cause the distal end of the boom to raise and lower, respectively.

5. The delivery assembly of claim 1, wherein the first coupler includes a connection point configured to mate with a mating seal of the second coupler, the connection point at least partially surrounded by guide structure configured to guide the connection point into engagement with the mating seal of the second coupler.

6. The delivery assembly of claim 1, wherein the clamp assembly includes an actuator configured to pivot at least one clamp plate between the clamping position and the release position, whereby in the clamping position the at least one clamp plate is in engagement with at least one recess in the second coupler and whereby in the release position, the at least one clamp plate is disengaged from the at least one recess.

7. The delivery assembly of claim 1, further comprising a first check valve upstream of said first and second couplers.

8. The delivery assembly of claim 7, further comprising a second check valve downstream of said first and second couplers.

9. The delivery assembly of claim 8, further comprising a compressed air pump configured to deliver compressed air to push liquid out of the conduit before decoupling the first and second couplers after transfer of the crop input from the crop input supply to the storage tank on the implement.

* * * * *